United States Patent [19]

Howsley

[11] Patent Number: 4,738,562
[45] Date of Patent: Apr. 19, 1988

[54] APPARATUS FOR INSERTING BACKING ROD INTO CONCRETE EXPANSION JOINTS

[75] Inventor: Michael J. Howsley, Weatherford, Tex.

[73] Assignee: JMK International, Inc., Fort Worth, Tex.

[21] Appl. No.: 50,722

[22] Filed: May 15, 1987

[51] Int. Cl.⁴ .............................................. E01C 23/09
[52] U.S. Cl. ................... 404/87; 280/43.17; 29/235
[58] Field of Search .......... 404/73, 74, 87, 88; 280/43.14, 43.17, 43.18; 52/741, 743, 744; 29/235, 451

[56] References Cited

U.S. PATENT DOCUMENTS

| | | | |
|---|---|---|---|
| 2,045,256 | 6/1936 | Voigt et al. | 404/87 |
| 2,354,586 | 7/1944 | Fischer | 404/87 |
| 2,699,952 | 1/1955 | Sebel | 280/47.1 |
| 2,783,055 | 2/1957 | Michaud | 280/43.14 |
| 3,038,397 | 6/1962 | Middlestadt | 404/87 |
| 3,368,465 | 2/1968 | Tonjes | 404/87 |
| 3,422,734 | 1/1969 | Tonjes et al. | 404/87 |
| 3,466,988 | 9/1969 | Sharpe | 404/87 |
| 3,538,820 | 11/1970 | Tonjes | 404/87 X |
| 3,570,379 | 3/1971 | Johnson | 404/87 |
| 3,608,445 | 9/1971 | Sharpe | 404/87 |
| 3,782,750 | 1/1974 | Peters | 280/43.17 |

Primary Examiner—Stephen J. Novosad
Assistant Examiner—John F. Letchford
Attorney, Agent, or Firm—James E. Bradley

[57] ABSTRACT

A machine for inserting a strip into a concrete expansion joint has features to raise and lower insertion disks. The machine has a frame mounted on wheels. The insertion disks are mounted to the same axle as the wheels. The axles are eccentric, having a central offset portion. A control disk mounted to the outside of the axle, rotates the axle to raise and lower the insertion disk. A pair of linkage bars connect the control disk to an upper control disk which is operated by an operator. Another pair of linkage bars connect the rear axle to the front axle for movement in unison.

7 Claims, 3 Drawing Sheets

APPARATUS FOR INSERTING BACKING ROD INTO CONCRETE EXPANSION JOINTS

BACKGROUND OF THE INVENTION

1. Field of the Invention:

This invention relates in general to machinery for inserting a resilient strip into concrete expansion joints, and in particular to means for raising and lowering an insertion disk which pushes the strip into the joint.

2. Description of the Prior Art:

Grooves are cut into concrete surfaces, such as on roadways and in airports, to allow for expansion and contraction of the concrete. It is important to keep water from entering the groove. Various types of seals are placed in the groove to prevent the entry of water.

In one technique, a polyethylene, flexible cylindrical strip is placed in the bottom of the groove. This strip is commonly called backerod. A sealant, such as liquid room temperature vulcanizing (RTV) material, is placed on top of the backerod and allowed to cure.

The backerod is installed in various manners. It is slightly larger in diameter than the groove, thus has to be pressed into the groove. It needs to be located at a constant depth in the groove. The task is time consuming.

SUMMARY OF THE INVENTION

In this invention, a machine is provided for inserting the backerod. The machine has a frame, with a handle for pushing the frame along the concrete surface. The machine has two axles, each of which has wheels mounted to it for rolling along the concrete surface. Each axle has an offset center portion. An insertion disk is rotatably mounted in the central portion for insertion into the groove.

A lower control disk is rigidly mounted to one of the axles. When the control disk is rotated, it rotates the offset center portion to raise and lower the insertion disk. A reaction disk is mounted on the opposite side of the axle from the lower control disk. The reaction disk rotates in unison with the lower control disk. A pair of linkage bars connect the reaction disk to another reaction disk located on the other axle. The linkage bars cause both reaction disks to rotate in unison with each other.

An upper control disk is mounted to the upper end of the handles. A pair of linkage bars connects the upper control disk with the lower control disk. When the upper control disk is rotated, it rotates the lower control disk to selectively raise and lower both of the insertion disks.

DESCRIPTION OF THE PREFERRED EMBODIMENT

Figure 1:
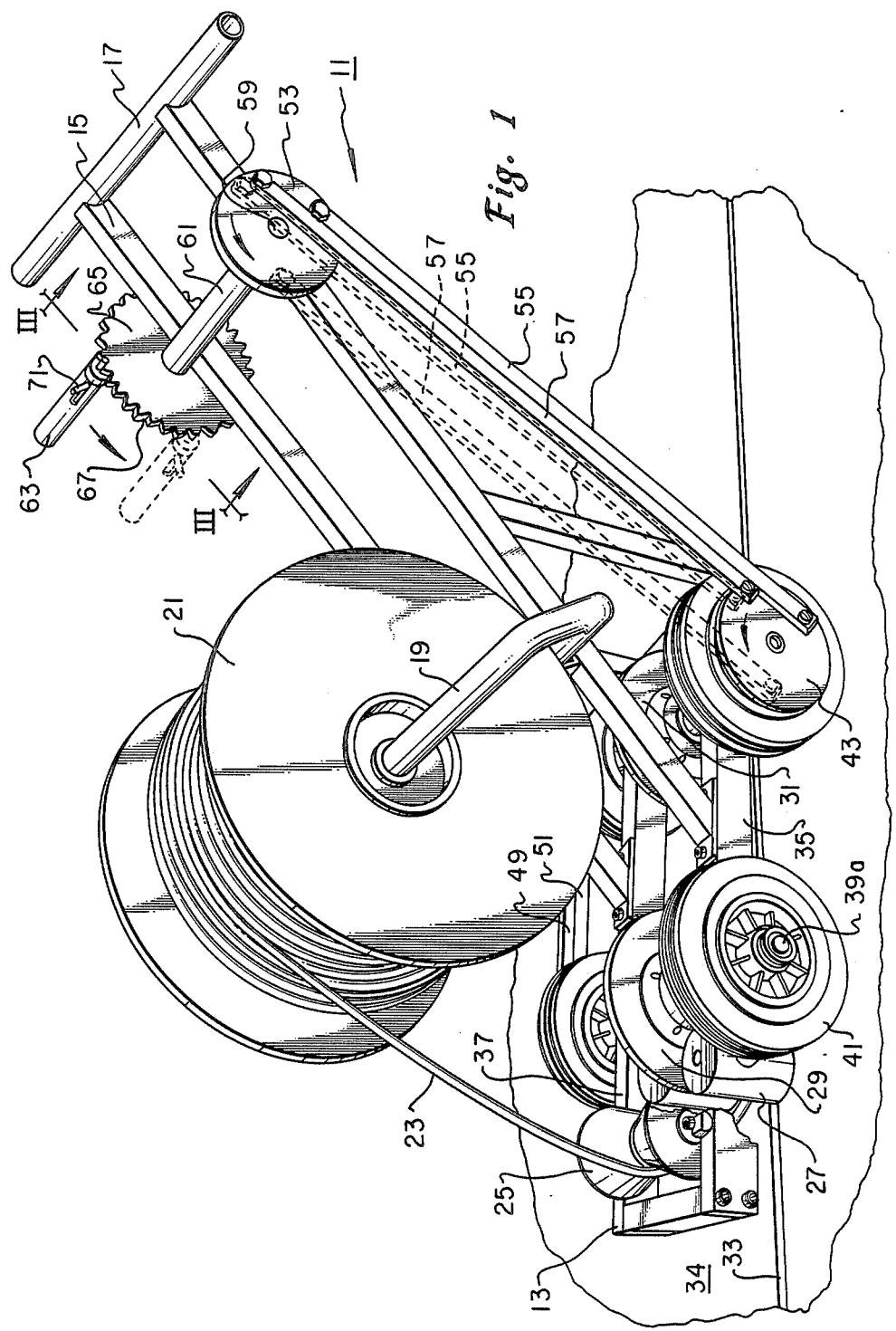
FIG. 1 is a perspective view illustrating a machine constructed in accordance with this invention.

Referring to FIG. 1, the rod installing machine 11 has a metal frame 13. A handle 15 extends upward from the frame 13 for pushing the frame 13. A handle bar 17 is located at the upper end of the handle 15. A support arm 19 extends upward from the handle 15 for supporting a reel 21. The opposite end of arm 19 (shown in FIG. 5) is threaded and contains a wingnut for tightening the reel 21 to the arm 19. Reel 21 contains a quantity of the backerod 23 wrapped around about it. Backerod 23 is a solid, cylindrical strip of polyethylene.

The backerod 23 is drawn from the reel 21 past a V-roller 25 located at the forward end of the frame 13. From there, the backerod 23 is pulled through a pair of cylindrical pinch rollers 27. The pinch rollers 27 are mounted vertically and rotatably to the frame 13. The pinch rollers 27 are spaced together a distance slightly less than the diameter of the backerod 23 to squeeze the backerod 23 as it is pulled from the reel 21.

Figure 4:
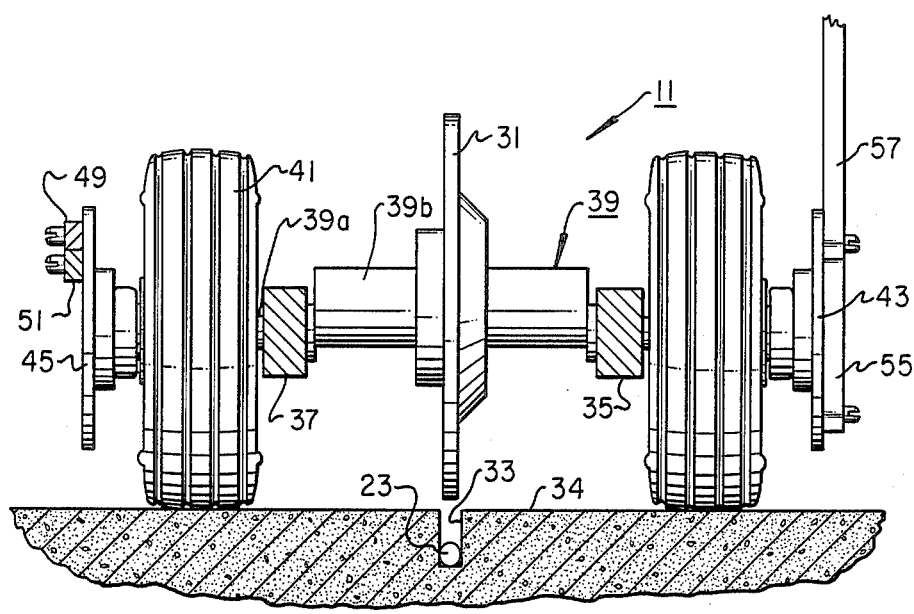
FIG. 4 is a sectional view of the machine of FIG. 1, taken along the line IV—IV of FIG. 2.

A pair of insertion disks 29 and 31 are used to push the backerod 23 into a groove 33 in a concrete surface 34. The diameter of the backerod 23 is slightly larger than the width of groove 33, but is squeezed by the pinch rollers 27 to a dimension slightly less than the width of the groove 33. Each insertion disk 29, 31 is a cylindrical wheel with an edge sized to enter the groove 33 in the concrete surface 34, as shown in FIG. 4. The insertion disks 29, 31 are longitudinally aligned with each other and are located rearward of the pinch rollers 27.

Referring to FIGS. 1 and 4, the frame 13 has a pair of longitudinal rails 35, 37 that extend along the length of the frame 13. The rails 35, 37 are connected together at their ends and are spaced apart from each other. Two axles 39 are rotatably mounted to the rails 35, 37. As shown in FIG. 4, each axle 39 has an end portion 39a that passes through the rails 35, 37. Each axle 39 has a central portion 39b that is located between the rails 35 and 37. The central portion 39b is eccentric relative to the end portion 39a. The end portions 39a are coaxial with each other. The axis of the central portion 39b is offset from and parallel to the axis of the end portions 39a.

Figure 2:
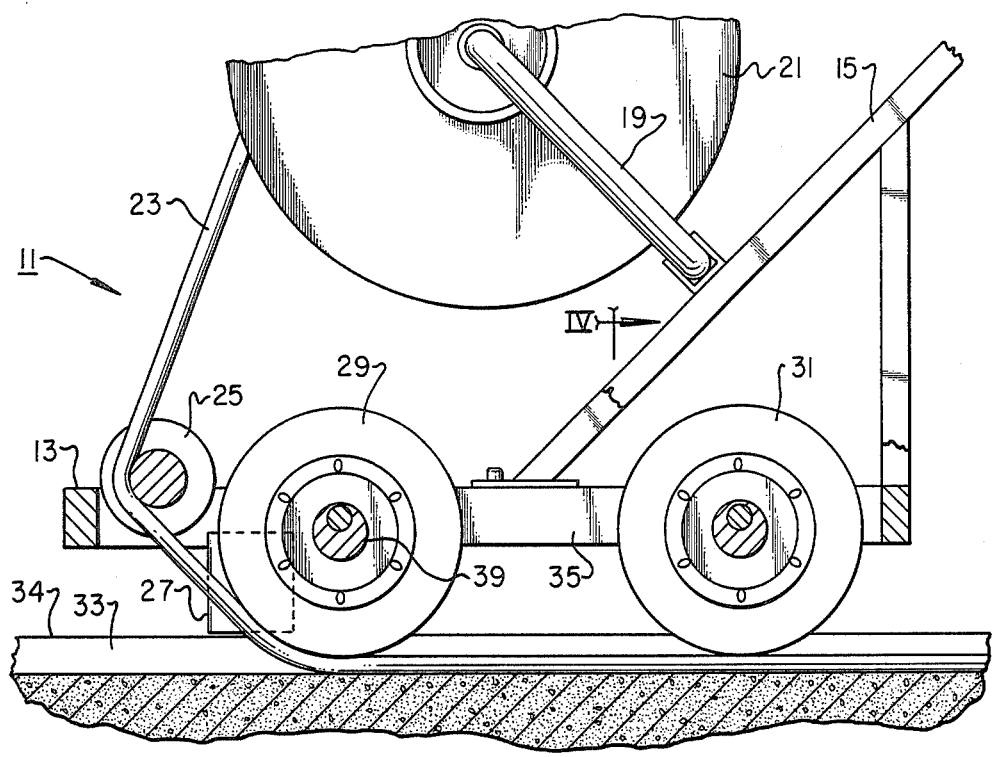
FIG. 2 is a side view, partially sectioned, of the machine in FIG. 1.

An insertion disk 29, 31 is rotatably mounted to each central portion 39b. The axle 39 can be rotated about 165 degrees to position the offset central portion 39b at various distances from the bottom of the groove 33. In FIG. 4, the axle central portion 39b is in an upper position, which places the lower edge of the insertion disk 31 above the concrete surface 34. In the lower position, illustrated in FIG. 2, the lower edges of the disks 29,31 are located in the groove 33.

A wheel 41 is mounted on bearings (not shown) to each end portion 39a. Each wheel 41 is located outward from the rails 35, 37. Each wheel 41 rotates on the axle end portion 39a and supports the frame 13 on the concrete surface 34.

Rotation of the axles 39 between the upper and lower positions is handled through a lower control disk 43. The lower control disk 43 is a rigid circular plate. The lower control disk 43 is rigidly mounted to the rear axle end portion 39a, so that it will rotate the axle 39 when it is rotated. A rear reaction disk 45 is mounted on an end portion 39a on the side opposite from the lower control disk 43. The rear reaction disk 45 is a flat circular plate similar to the lower control disk 43. The rear reaction disk 45 is rigidly mounted to the end portion 39a so that when the axle 39 is rotated by the lower control disk 43, the rear reaction disk 45 will rotate.

Figure 5:
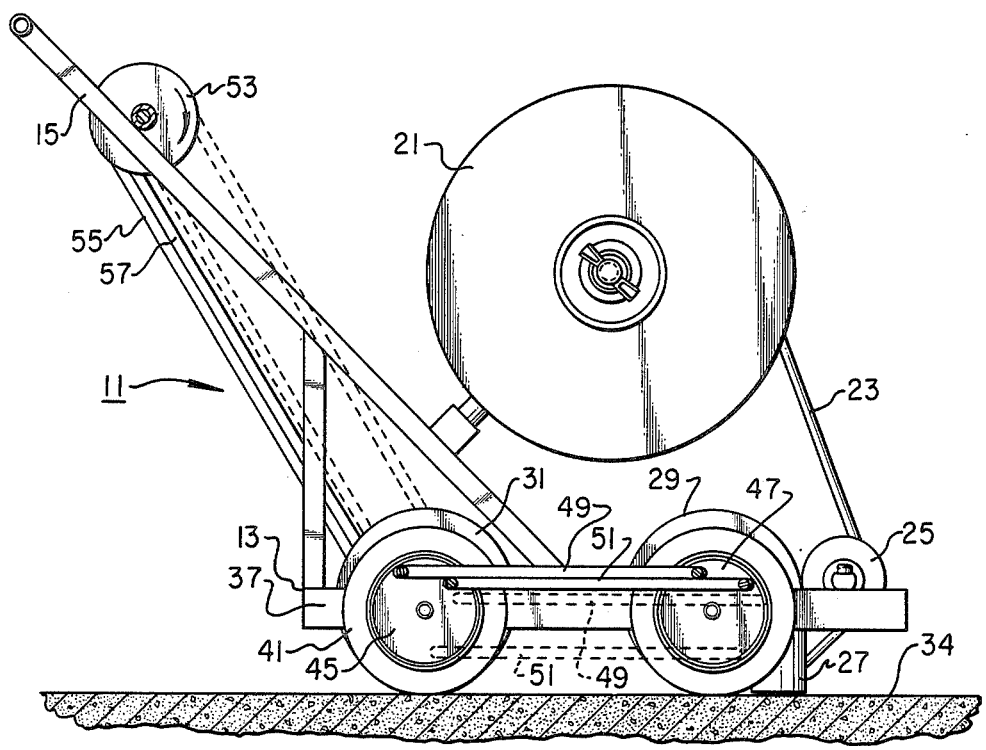
FIG. 5 is a side view of the machine of FIG. 1, shown from the opposite side.

As shown in FIG. 5, rotation of the rear reaction disk 45 results in the front axle 39 rotating also. This is handled through a front reaction disk 47, which is identical to the rear reaction disk 45. The front reaction disk 47 is rigidly mounted to the end portion 39a of the front axle 39.

A pair of linkage bars 49, 51 interconnect the rear reaction disk 45 with the front reaction disk 47. Each end of each linkage bar 49, 51 is rotatably or pivotally secured to one of the reaction disks 45, 47. Each linkage bar 49, 51 is of the same length. The ends are secured a different points on the outer periphery of the disks 45, 47. The point at which each linkage bar 49, 51 is secured is selected so that the linkage bars 49, 51 will be parallel to each other regardless of the rotational position of the reaction disks 45, 47. In the upper position, shown in FIG. 5, the insertion disks 29, 31 are in the uppermost position. The linkage bars 49, 51 will be on the upper side of the reaction disks 45, 47 and in contact with each other.

The reaction disks 45, 47 can be rotated about 165 degrees clockwise from the position shown in FIG. 5. While moving to the lower position, the linkage bars 49, 51 will separate from each other, but will still be parallel, as indicated by the dotted lines. In the lowermost position (not shown), the linkage bars 49, 51 will again be in contact with each other, but will be on the lower side of the reaction disks 45, 47.

Referring to FIG. 1, the lower control disk 43 is rotated between the upper and lower positions by the operator. This is handled by an upper control disk 53, which is rotatably mounted to the handle 15 near the bar 17. The upper control disk 53 is connected to the lower control disk 43 by a pair of linkage bars 55, 57.

The linkage bars 55, 57 are pivotally or rotatably mounted to the control disks 43, 53. Linkage bars 55,57 are of the same length. The ends are secured at different points on the periphery of the control disks 43, 53. The linkage bars 55, 57 are parallel in all positions, as shown by the dotted lines. The dotted lines show the linkage bars 49, 51 in a position wherein the insertion disks 29, 31 have been lowered part way from the uppermost position. In the uppermost position, the linkage bars 55, 57 will be in contact with each other and on the rearward sides of the control disks 43, 53 as shown by the solid lines. In the lowermost position (not shown), the linkage bars 55, 57 will again be in contact with each other, but will be on the forward sides of the control disks 43, 53.

The upper control disk 53 is mounted to a shaft 59. The shaft 59 is rotatably carried in a sleeve 61 that is rigidly mounted to the handle 15. A lever arm 63 is rigidly mounted to the shaft 59 on the side opposite the upper control disk 53. A locking plate 65 is rigidly mounted to the handle 15 adjacent the lever arm 63. The locking plate has teeth 67 on its edge which have slots between them.

Figure 3:
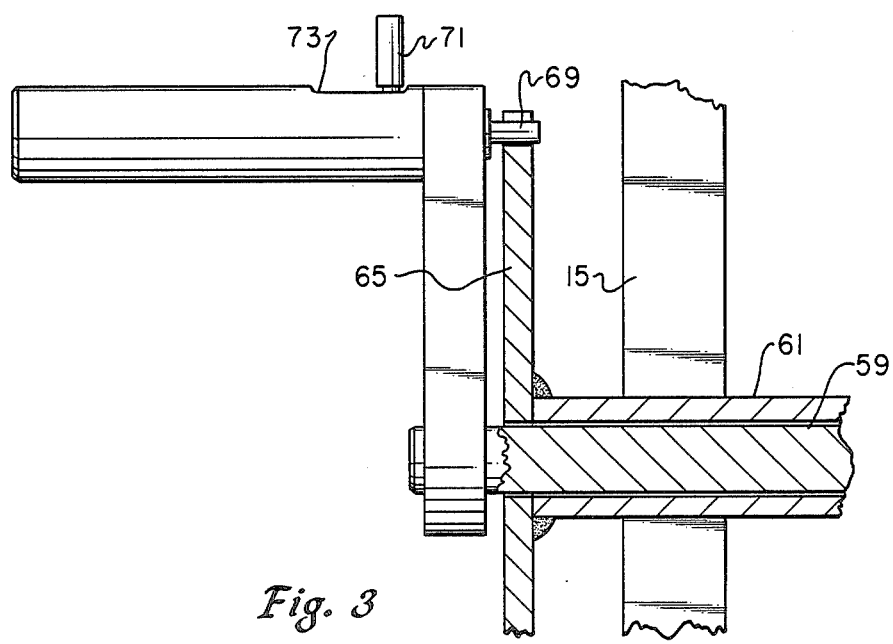
FIG. 3 is a partial enlarged sectional view taken along the line III—III of FIG. 1.

As shown in FIG. 3, the lever arm 63 has a spring loaded pin 69 that will engage the slots between the teeth 67. When engaged, the lever arm 63 cannot rotate, locking the upper control disk 53 in the desired position. A retracting member 71, which protrudes from a slot 73 in the lever arm 63, allows the pin 69 to be retracted to rotate the lever arm 63 to a new position.

In operation, the operator will push the handle 15 to move the machine 11 along the concrete surface 34. The backerod 23 will feed through the rollers 27 and be pushed into the groove 33 with the insertion disks 29, 31. The insertion disks 29, 31 are positioned to push the backerod 23 to the bottom of the groove 33.

The height of the insertion disks 29, 31, is controlled by the lever arm 63. To lower the insertion disks 29, 31, the operator retracts the pin 69 (FIG. 3) and pushes the lever arm 63 forward, as shown by the dotted lines in FIG. 1. When this occurs, the upper control disk 53 will rotate as indicated by the arrow shown in FIG. 1. This causes the linkage bars 55, 57 to rotate the lower control disk 43.

The lower control disk 43 rotates the axle 39, as shown in FIG. 4. This moves the offset central portion 39b lower. At the same time, the rear reaction disk 45 will rotate with the rotation of the axle 39. As shown in FIG. 5, this rotation causes the front reaction disk 47 to rotate also through movement of the linkage bars 49, 51. The front reaction disk 47 will rotate the front axle 39. Both insertion disks 29, 31 will simultaneously move to a lower position.

When at the desired lower position, the retracting member 71 (FIG. 3) is released, allowing the pin 69 to insert between two of the teeth 67. This locks the upper control disk 53, lower control disk 43, and reaction disks 45, 47 in position.

The invention has significant advantages. The machine presses the backerod into place rapidly and accurately. The variable height insertion disks assure that the backerod is in the bottom of the joint or groove. The reaction disks and control disks allow the insertion disk to be easily raised and lowered simultaneously by the operator to accommodate for differences in depth of the grooves.

While the invention has been shown in only one of its forms, it should be apparent to those skilled in the art that it is not so limited, but is susceptible to various changes without departing from the scope of the invention.

I claim:

1. An apparatus for inserting a resilient strip into a groove in a concrete surface, comprisisng in combination:

a frame;

a handle mounted to the frame and extending upward and rearward;

a reel rotatably mounted to the frame and adapted to contain a quantity of the strip;

an axle rotatably carried by the frame, the axle having coaxial end portions engaging the frame on each side, the axle having a central portion that is offset from the end portions;

a wheel rotatably mounted to each end portion of the axle for rolling contact with the concrete surface;

an insertion disk rotatably mounted to the central portion of the axle for insertion into the groove to push the strip drawn from the reel into the groove;

a lower control disk rigidly mounted to one end portion for rotation with the axle;

an upper control disk rotatably mounted to the handle, for selected rotation by an operator; and a linkage bar having each end pivotally mounted to the upper and lower control disks, so that rotation of the upper control disk rotates the lower control disk and the axle to selectively move the insertion disk up and down relative to the frame.

2. The apparatus according to claim 1 wherein the lower control disk is located outward of the wheel.

3. The apparatus according to claim 1 further comprising locking means on the handle for selectively locking the upper control disk to the handle to prevent rotation.

4. An apparatus for inserting a resilient strip into a groove in a concrete surface, comprising in combination:
   a frame;
   a handle mounted to the frame and extending upward and rearward;
   a reel rotatably mounted to the frame and adapted to contain a quantity of the strip;
   a plurality of wheels rotatably mounted to the frame for rolling the frame on the concrete surface;
   an axle rotatably mounted to the frame, the axle having coaxial end portions and a central portion that is offset from the ends, the central portion having an axis that is parallel to, but offset from the axis of the end portions;
   an insertion disk rotatably mounted to the central portion for insertion into the groove to push the strip into the groove, the insertion disk being movable along with the central portion of the axle between an upper position located above the lower edge of the wheels and a lower position in which the lower edge of the insertion disk is below the lower edge of the wheels for insertion into the groove;
   a lower control disk rigidly mounted to one end portion for rotation with the axle;
   an upper control disk rotatably mounted to the handle for relative rotation by an operator; and
   a pair of linkage bars mounted between the upper and lower control disks, the ends being pivotally connected to the control disks, so that the linkage bars remain parallel to each other as the control disks are rotated to move the insertion disks between the upper and lower positions, the rotational movement of the upper control disk by an operator rotating the lower control disk and the axle to selectively raise and lower the insertion disk.

5. The apparatus according to claim 4 further comprising:
   a shaft rotatably carried on the handle, the upper control disk being rigidly mounted to one end of the shaft for rotation therewith;
   a locking plate rigidly mounted to the handle adjacent the end of the shaft opposite the upper control disk, the locking plate having a plurality of slots;
   a lever arm mounted to the shaft for rotation therewith and located adjacent the locking plate; and
   pin means in the arm for selectively engaging one of the slots to selectively lock the shaft to the locking plate and prevent rotation of the upper control disk.

6. An apparatus for inserting a resilient strip into a groove in a concrete surface, comprising in combination:
   a frame;
   a reel rotatably mounted to the frame and adapted to contain a quantity of the strip;
   front and rear axles pivotally carried by the frame;
   each axle having coaxial end portions extending past the frame on each side, each axle having a central portion that is offset from the end portions, the central portion having an axis that is parallel to, but offset from the axis of the end portions;
   a wheel rotatably mounted to each end portion of each axle for rolling contact with the concrete surface;
   an insertion disk rotatably mounted to the central portion of each axle for insertion into the groove to push the strip into the groove, the insertion disks being movable along with the central portions between an upper position and a lower position;
   a control disk rigidly mounted to one end portion of one of the axles;
   a first reaction disk rigidly mounted to the end portion of the same axle on the opposite side from the control disk;
   a second reaction disk rigidly mounted to the other axle and on the same side of the frame as the first reaction disk;
   a linkage bar having an end rotatably mounted to one of the reaction disks, so that rotation of one of the reaction disks rotates the other reaction disk; and
   means for selectively rotating the control disk to rotate the reaction disks and move the axles and the insertion disks between the upper and lower positions.

7. An apparatus for inserting a resilient strip into a groove in a concrete surface, comprising in combination:
   a frame;
   a reel rotatably mounted to the frame and adapted to contain a quantity of the strip;
   front and rear axles pivotally carried by the frame;
   each axle having coaxial end portions rotatably mounted to the frame and extending past the frame on each side, each axle having a central portion that is offset from the end portions, the central portion having an axis that is parallel to, but offset from the axis of the end portions;
   a wheel rotatably mounted to each end portion of each axle for rolling contact with the concrete surface;
   an insertion disk rotatably mounted to the central portion of each axle for insertion into the groove to push the strip into the groove;
   a lower control disk rigidly mounted to one end portion of the rear axle;
   a rear reaction disk rigidly mounted to one of the end portions of the rear axle on the opposite side of the frame from the lower control disk;
   a front reaction disk rigidly mounted on one of the end portions of the front axle and on the same side of the frame as the rear reaction disk;
   a pair of reaction linkage bars, each having an end pivotally mounted to each of the reaction disks, so that rotation of the rear reaction disk of less than one full turn rotates the forward reaction disk the same amount, the linkage bars being positioned to remain parallel with each other as the reaction disks are rotated between upper and lower positions;
   an upper control disk rotatably mounted to the handle for relative rotation of less than one full turn by an operator;
   a pair of control linkage bars, each having its ends pivotally connected between the upper and lower control disks, so that rotation of the upper control disks less than one full turn rotates the lower control disk by the same amount, the ends of the linkage bars being positioned so that the linkage bars remain parallel with each other in all rotational positions; and
   means on the handle for selectively locking the upper control disk to the handle to prevent rotation.

* * * * *